(12) United States Patent
Sanford et al.

(10) Patent No.: US 10,977,894 B2
(45) Date of Patent: Apr. 13, 2021

(54) SYSTEMS AND METHODS FOR GAMING ACCOUNT FUNDING

(71) Applicant: Sightline Interactive LLC, Las Vegas, NV (US)

(72) Inventors: Kirk E. Sanford, Las Vegas, NV (US); Thomas M. Sears, Henderson, NV (US); Omer Sattar, Las Vegas, NV (US)

(73) Assignee: SIGHTLINE INTERACTIVE LLC, Las Vegas, NV (US)

( * ) Notice: Subject to any disclaimer, the term of this patent is extended or adjusted under 35 U.S.C. 154(b) by 319 days.

(21) Appl. No.: 15/936,804

(22) Filed: Mar. 27, 2018

(65) Prior Publication Data

US 2018/0218567 A1 Aug. 2, 2018

Related U.S. Application Data

(63) Continuation of application No. 15/243,412, filed on Aug. 22, 2016, now Pat. No. 9,990,801, which is a continuation-in-part of application No. 14/962,321, filed on Dec. 8, 2015, now Pat. No. 9,600,966, which is a continuation of application No. 14/326,596, filed on Jul. 9, 2014, now Pat. No. 9,251,651, which is a continuation of application No. 14/033,495, filed on Sep. 22, 2013, now Pat. No. 8,777,725.

(60) Provisional application No. 61/744,564, filed on Sep. 28, 2012.

(51) Int. Cl.
*G07F 17/32* (2006.01)
*G06Q 20/22* (2012.01)

(52) U.S. Cl.
CPC ....... *G07F 17/3241* (2013.01); *G06Q 20/227* (2013.01); *G07F 17/3225* (2013.01); *G07F 17/3239* (2013.01); *G07F 17/3251* (2013.01); *G07F 17/3255* (2013.01); *G07F 17/3288* (2013.01)

(58) Field of Classification Search
CPC .. G07F 17/32; G07F 17/3225; G07F 17/3227; G07F 17/3237; G07F 17/3239; G07F 17/3255
See application file for complete search history.

(56) References Cited

U.S. PATENT DOCUMENTS

| | | | |
|---|---|---|---|
| 2007/0203832 A1* | 8/2007 | Babi | G06Q 20/40 705/39 |
| 2012/0054102 A1* | 3/2012 | Schwartz | G06Q 20/322 705/44 |
| 2012/0184362 A1* | 7/2012 | Barclay | G07F 17/3281 463/25 |
| 2012/0310824 A1* | 12/2012 | Liberty | G06Q 20/3255 705/40 |

* cited by examiner

*Primary Examiner* — James S. McClellan
(74) *Attorney, Agent, or Firm* — Ulmer & Berne LLP

(57) ABSTRACT

Systems and methods are disclosed for associating a player identifier with a financial account. The financial account can holds funds that are accessible through the player's use of a payment vehicle. The payment vehicle can be, for example, a credit payment vehicle or a debit payment vehicle. The player can load funds from the financial account to a wagering account.

15 Claims, 7 Drawing Sheets

SYSTEMS AND METHODS FOR GAMING ACCOUNT FUNDING

CROSS-REFERENCE TO RELATED APPLICATIONS

This application is a continuation of prior application U.S. patent application Ser. No. 15/243,412, entitled "SYSTEMS AND METHODS FOR GAMING ACCOUNT FUNDING," filed on Aug. 22, 2016, which is a continuation-in-part of prior application U.S. patent application Ser. No. 14/962,321, entitled "SYSTEMS AND METHODS FOR TRACKING OF NON-WAGERING ACCOUNT ASSOCIATED WITH GAMING ENVIRONMENT," filed on Dec. 8, 2015, which is a continuation of prior application U.S. patent application Ser. No. 14/326,596, entitled "SYSTEMS AND METHODS FOR TRACKING OF NON-WAGERING ACCOUNT ASSOCIATED WITH GAMING ENVIRONMENT," filed on Jul. 9, 2014, which is a continuation of prior application U.S. patent application Ser. No. 14/033,495, now U.S. Pat. No. 8,777,725, entitled "SYSTEMS AND METHODS FOR TRACKING OF NON-WAGERING ACCOUNT ASSOCIATED WITH GAMING ENVIRONMENT," filed on Sep. 22, 2013, which claims priority to the disclosure of U.S. Provisional Patent Application Ser. No. 61/744,564, entitled "DUAL PREPAID/LOYALTY CARD FOR GAMING," filed Sep. 28, 2012, the disclosures of which are all herein by incorporated by reference in their entirety.

BACKGROUND

Within gaming establishments, such as casinos, gaming devices are typically networked via a central computer. Such configuration allows for the gaming establishment to monitor a player's gameplay for tracking purposes. Gaming devices typically accept cash, coins, or paper tickets. Gaming devices also typically issue paper tickets that are redeemable for cash. These paper tickets can be redeemed either at assisted-service counters (i.e., a casino cage) or through self-service computer systems, sometimes called Ticket-In-Ticket-Out (TITO) machines. Using cash or coins for wagering can be undesirable to many patrons, as patrons may not wish to carry cash or coins or may not be able to easily withdraw cash from various accounts. Further, drawbacks of using paper tickets for wagering is that the players may very easily lose tickets, tickets can become destroyed or damaged, casinos incur cost from replenishing tickets, and casinos incur cost for maintaining ticket printers. Additionally, the use of tickets requires that operators of casinos ensure that sufficient amounts of cash are available on the gaming floor to accommodate redemptions at both the assisted-service counters and the TITO machines.

With regard to casino table games, players wishing to play typically must first exchange cash for an amount of chips which can then be used for gaming. When the player wants to convert the chips back to the cash, the player typically exchanges their chips for an equivalent amount of cash at a cashier cage at the casino. Thus, in addition to ensure sufficient cash is available for ticket redemptions, operators of casinos must ensure also sufficient amounts of cash are available at the cashier cage to accommodate player exchanging chips for cash. This process for routinely replenishing cash by the casino operator is both costly and burdensome.

Therefore, the field can benefit from systems and methods providing cashless wagering and redemption, which provides advantages to both game players and casino operators.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1:
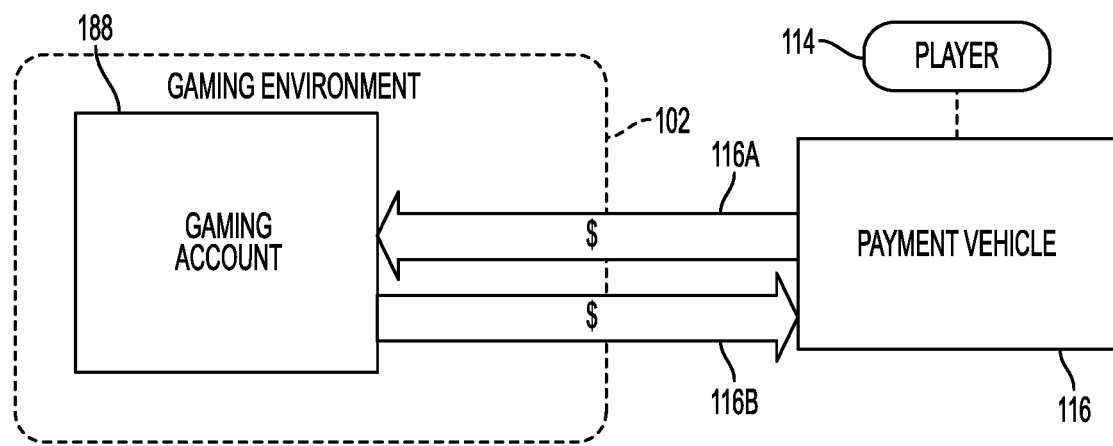
FIG. 1 schematically illustrates an association between a payment vehicle and a gaming account in accordance with one non-limiting embodiment of the present disclosure.

The presently disclosed system and methods can generally allow for gaming-related financial transactions. As described in more detail below, utilizing a transaction facilitator, a player can selectively transfer funds between various types of gaming accounts and an associated account, such as a financial account and/or a casino level player account. The financial account can be a financial account that is maintained by an issuing financial institution, with funds in the financial account accessible to the cardholder through an associated payment vehicle using open-loop or closed-loop payment processing, for example. The payment vehicle can be any suitable payment vehicle, such as a physical card, a virtual payment device, or have any other suitable format. In some embodiments the payment vehicle is a credit payment vehicle (i.e., a credit card). In some embodiments the payment vehicle is a debit payment vehicle (i.e., a debit card). The credit or debit payment vehicle can also be embodied as a mobile payment device, such as a mobile wallet or other type of mobile payment technology. The payment vehicle can be an open-loop payment vehicle. Being an open loop payment vehicle, it is associated with a bank card network (MASTERCARD, VISA, DISCOVER, and so forth) and can generally be used at any merchant or ATM accepting payment cards associated with the bank card network.

Gaming environments can utilize different types of gaming accounts, such as casino level player accounts and/or wagering accounts. With regard to wagering accounts, some types of wagering accounts are regulated by jurisdictional gaming statutes. For the purposes of illustration, three different types of wagering accounts are described herein (internet gaming wagering accounts, brick-and-mortar wagering accounts, and race-and-sports wagering accounts), although this disclosure is not so limited. In fact, the systems and methods described herein are generally applicable to the transfer of between any suitable wagering account and an associated financial account, or intermediary account, such as a casino level player account, as described below.

As used herein, internet gaming wagering account (or iGaming wagering account), generally means an electronic ledger wherein the following types of transactions relative to internet or mobile gaming system are recorded: (a) deposits; (b) withdrawals; (c) amounts wagered; (d) amounts paid on winning wagers; (e) service or other transaction-related charges authorized by the patron; and (f) adjustments to the account.

As used herein, brick-and-mortar wagering account generally means an electronic ledger for a brick-and-mortar cashless wagering system patron deposit account wherein the following types of transactions are recorded to and from gaming devices (i.e.; slots): (a) deposits and withdrawals of cash or cash equivalents at a designated area of accountability; (b) deposits initiated with a debit instrument; (c) wagering account transfers to and from gaming devices; (d) wagering account adjustments.

As used herein, race-and-sports wagering account generally means an electronic ledger wherein the following types of transactions relative to sports and non-pari-mutuel race wagers are recorded: (a) deposits; (b) withdrawals; (c) amounts wagered; (d) amounts paid on winning wagers; (e) amounts paid for horse racing-related services or merchandise; (f) service or other transaction-related charges authorized by the patron; and (g) adjustments to the account.

As described in more detail below, a transaction facilitator can generally direct or enable transactions with the issuing financial institution to affect the increasing and decreasing of an account balance of the financial account. A transaction facilitator can also generally direct or enable transactions with a computing system that manages a gaming account of a gaming environment to affect the increasing and decreasing of an account balance of the gaming account. The issuing financial institution can also receive communications related to the financial account in a traditional fashion via an open system from merchants through existing bank card networks. Such communications can authorize/decline purchases using funds held in the financial account.

In some embodiments, a player can be associated with a unique player identifier that can be used by a casino or other gaming environment to identify a particular player. Such a player identifier may be issued subsequent to the player enrolling in a casino loyalty program, for example. In some cases, the unique player identifier is embossed on a player card, sometimes referred to as a loyalty card, or is otherwise accessible or presentable by a player. In some embodiments, the player identifier can be a graphical code, such as a quick-response (QR) code displayable on a mobile computing device or the player identifier can be a barcode printed on a keychain fob or other substrate. The player identifier can be transferred via non-contacting communications between a mobile computing device and a gaming device. In any event, the player identifier can be provided to a gaming device or casino representative to enable the casino to centrally track the player's wagering activity. The player identifier is linked by the issuing entity (such as a casino) a loyalty profile that can be stored or otherwise maintained by customer relationship software that is maintained by the casino or on behalf of the casino by an affiliated service provider.

As described in more detail below, a player identifier for a particular player can be linked to, or otherwise associated with, a financial account held by a financial institution and accessible by the particular player. Such a linkage or association offers a variety of benefits, both to players and an associated casino. For example, in one example implementation, a player can interact with a gaming device (such as a slot machine) by providing a player identifier to the device. In some cases, additional credentials, such as a PIN or password, can be provided by the player. Through network communications, the gaming device can communicate with various computing platforms, such as a slot management system and/or casino management system, which generally may be referred to as a casino computing system, to authenticate the player's identity. Once authenticated, the player can selectively access funds that are maintained in the financial account of an issuing financial institution for use at the gaming device. The casino computing system can communicate with a transaction facilitator (such as through API-calls, or other suitable communication techniques) to provide the information to identify the player that is seeking to access funds. In one embodiment, a player identifier of the player is provided to the transaction facilitator. As described in more detail below, the player identifier can be the loyalty account number or other type of identifier. The transaction facilitator can also store the registered financial account information for the player, with the financial information being associated with one or more payment vehicles. Thus, when the player identifier is provided to the transaction facilitator, the transaction facilitator in turn, can determine a financial account associated with that player. Through closed network communications with the issuing financial institution associated with that financial account, the transaction facilitator can dispatch appropriate messaging to seek authorization to debit the financial account. Such authorization may be an authorization request transmitted through an electronic payment network. The authorization request can include various information, such as a merchant category code (MCC), requested amount of funds to be authorized, payment vehicle information, cardholder identification information, and so forth. The request can be routed through the appropriate payment network based on the payment vehicle to a payment vehicle issuer. Example payment networks include the VISA, MASTERCARD, DISCOVER, and AMERICAN EXPRESS payment networks. The payment vehicle issuer can receive the request and determine whether to authorize the funds. A response to the authorization request is then provided through return communications. Based on the response, the transaction initiated at the gaming device is either approved or denied. Indication of authorization can be provided to the casino computing system by the transaction facilitator. The indication of authorization along with other relevant data, such as a timestamp, transaction amount, card type, and so forth, can also be stored by the transaction facilitator in a data store. Such records can be used for various accounting-related purposes, such as reconciliation and account balancing. The records can also be utilized for gaming-related purposes, such as for management of responsible gaming protocols and the like. The casino computing system can then credit a one or more gaming accounts of the player to increase their available balance. Funds, in the form of gaming credits, can then be distributed to the gaming device (sometimes referred to as a wagering account transfer in "WAT in"). At a later point in time, when the player wishes to "cash out," the credits of the gaming device can be transferred to a gaming account (sometimes referred to as a wagering account transfer out "WAT out"). Once received into the gaming account, the gaming credits can be converted to a fund amount and used to credit the financial account, dispensed in the form of a ticket or currency, held in the gaming account, or even transferred to another gaming account.

In some cases, funds that are cashed back out from the wagering account to a financial account associated may be subject to certain velocity limits implemented by the financial institution holding the financial account. The velocity limits may restrict, for instance, the amount of funds that can be placed back into the financial account in a certain timeframe. In order to decrease possible rejections by the financial institution due to exceeding of the velocity thresholds, the transaction facilitator can utilize logic to monitor for transactional activity that exceeds the preset velocity threshold. Any requests to post funds back to a financial account that exceed the velocity set by that financial institution can be rejected at the transaction facilitator level, such that transaction never actually makes it to the financial institution for processing.

In some embodiments, various transfers described below can be performed in substantially real-time. As used herein, substantially real-time means generally less than about 20 minutes, generally less than about 10 minutes, generally less that about 5 minutes, generally less than about 1 minutes, or generally less than about 30 seconds. Therefore, in the example described above, subsequent to the player "cashing out", the funds transferred to the financial account can be accessible to make purchases using the associated payment vehicle in substantially real-time.

In some embodiments, various transfers described below can be performed subsequent to a funding delay or subject to certain transaction velocity limits, as may be controlled or otherwise implemented by the transaction facilitator. The funding delay may be greater than 5 minutes, 10 minutes, or 20 minutes, or any other suitable period of time. The length of the delay can be set by, for instance, a governing authority, a gaming operator and/or a user. The length of delay can be universal, or vary per user or per groups of users. Transaction velocity generally relates to a number of transactions initiated by a consumer over a certain period of time using either one payment vehicle and/or across more than one payment vehicles. Such velocity checks can be associated with using the payment vehicle to fund a wagering account and/or purchase chips (i.e., for a table game). Running velocity checks can ensure that a certain payment vehicle can only be used a certain number of times in a given 24-hour period, for instance. Facilitating a funding delay and transaction velocity monitoring may assist with responsible gaming considerations.

Further, in various embodiments, the transaction facilitator, or other entity, may conduct an address verification check between the payment vehicle used for the transaction and the registered address on the wagering account. Some implementations in accordance with the present disclosure may require the payment vehicle holder (sometimes called a cardholder) to provide identifying information such as name, address, date of birth, social security number, and/or other information prior to first usage. Such information can be used in connection with a Know Your Customer (KYC) compliance program or for other compliance-related considerations. The compliance data associate with the payment vehicle can also be cross-verified with the compliance data of the wagering account provider for verification purposes. A certain number of player identifiers (i.e., loyalty card numbers, etc.) to a certain number of debit and credit card numbers, in its system.

In some embodiments, the transaction facilitator, or other appropriate entity, can maintain a self-exclusion list, based on payment vehicle card numbers. As such, a player can selectively exclude a certain payment vehicles that are prohibited from funding wagering accounts until the player affirmatively states that they wish to use that payment vehicle again.

Embodiments are hereinafter described in detail in connection FIGS. 1-6, wherein like numbers indicate the same or corresponding elements throughout the figures. It is noted that reference throughout the specification to "various embodiments," "some embodiments," "one embodiment," "some example embodiments," "one example embodiment," or "an embodiment" means that a particular feature, structure, or characteristic described in connection with the embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Figure 2A:
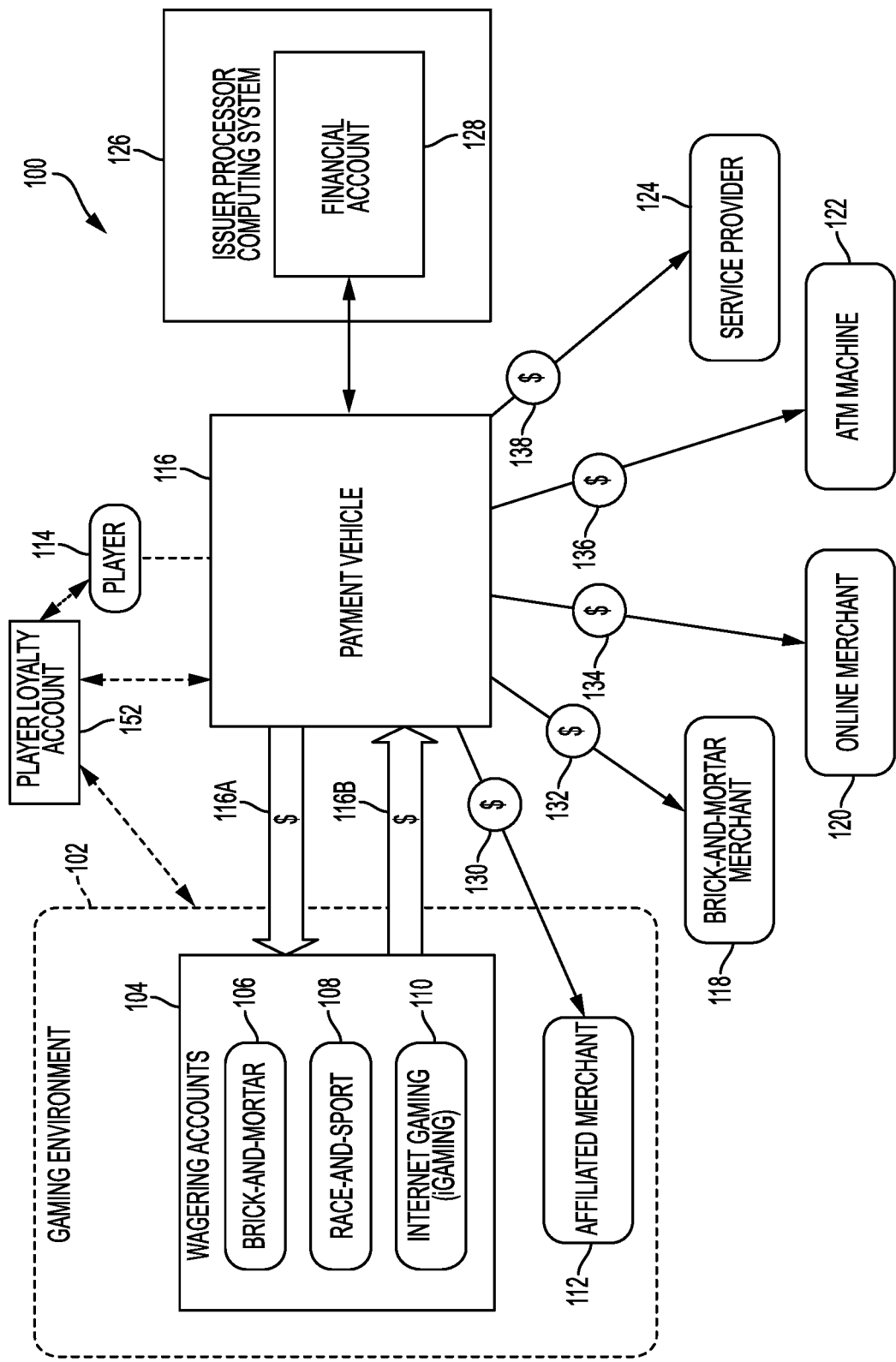
FIG. 2A depicts an example system view and flow process utilizing the payment vehicle of FIG. 1 in accordance with one non-limiting embodiment.

FIG. 1 is a schematically illustrates an association between a payment vehicle 116 and a gaming account 188 in accordance with one embodiment of the present disclosure. The gaming account 188 can be associated with a gaming environment 102. As used herein, gaming environment can refer to, without limitation, a brick-and-mortar casino and/or an online or virtual casino. In some cases, the gaming environment also extends to entities or services, such as third party computer systems generally controlled by or operated on behalf of a casino operator. FIG. 2A depicts an example system view and flow process 100 utilizing the payment vehicle 116 in accordance with one non-limiting embodiment.

Referring now to FIGS. 1 and 2A, a player 114 can be issued the payment vehicle 116 that is associated with a financial account 128 maintained by an issuer processor computing system 126. The issuer processor computing system 126 can be a system used to maintain and/or process transactions associated with the payment vehicle 116 and the financial account 128. The payment vehicle 116 can be a physical card, a virtual card, or any other suitable type of vehicle. In some embodiments, the payment vehicle 116 is a credit payment vehicle or a debit credit vehicle. As such, the payment vehicle 116 can be an "open-loop card," which a consumer can use anywhere that accepts payment from a retail electronic payments network associated with the payment vehicle, such as MASTERCARD, VISA, DISCOVER, and so forth, as discussed above.

The account type of the financial account 128 can vary based on the type of payment vehicle 116. For payment vehicles that are debit-based instruments, the financial account can be a demand deposit account (DDA), such as a checking account. As such, using the payment vehicle to fund a wagering account, or make other types of purchases, functions to decrease the available balance of the financial account 128. For payment vehicles that are credit-based instruments, the financial account reference an available credit limit usable by the cardholder. Using the payment vehicle to fund a wagering account, or make other types of purchases, functions to decrease the available credit limit of the financial account 128. For the sake of clarity, decreasing the available credit limit of the financial account 128 for credit payment vehicles may be referred to herein as decreasing the balance of the financial account 128. The player 114 can fund (i.e., increase the available balance) the financial account 128 through traditional techniques, such as by transfers funds from a demand access account (DDA), deposit cash, and so forth. The approach for increasing the balance of the financial account 128 may depend on the type of associated financial account. The payment vehicle 116 can be used by the player 114 to make purchases at a variety of merchant types. As shown in FIG. 2A, non-limiting example types of merchants include a brick-and-mortar merchant 118, an online merchant 120, an ATM machine 122, and a service provider 124. Accordingly, the payment vehicle 116 can be used to facilitate the transfer of funds from the financial account 128 through purchase transactions (schematically illustrated as transactions 132, 134, 136, and 138). In some cases, a particular merchant may be associated with the gaming environment 102, such as affiliated merchant 112. Example affiliated merchants 112 can include, without limitation, on-property retailers, restaurants, and hotels. While the affiliated merchant 112 is illustrated as being within the gaming environment 102, this disclosure is not so limited. In some embodiments the affiliated merchant 112 is an online merchant, for example. The payment vehicle 116 can be used for a purchase transaction 130 at such affiliated merchants 112. As described in more detail below, the systems and methods described herein can allow for the payment vehicle 116 to additional fund one or more wagering accounts 104, such as usable for gameplay at a slot machine, table game, and/or to purchase chips, and/or for other wagering purposes.

A gaming account 188 can be associated with the casino environment 102. As used herein, a gaming account 188 can be any type of financial account (i.e., electronic ledger) that is associated with a player, or collection of financial accounts that are associated with a player, and maintained by a casino, or at least on behalf of a casino. While FIG. 1 schematically shows one gaming account 188 for the sake of clarity, it is to be appreciated that the player 114 and/or the payment vehicle 116 can be associated with any number of gaming accounts 188. Further, the gaming account 188 can be any suitable account type. In FIG. 2A, for example, the gaming accounts associated with the player 114 are illustrated as wagering accounts 104. In other embodiments, such as described below in connection with FIG. 2B and FIG. 4, for example, the gaming account 188 can comprise a casino level player account. Still referring to FIG. 1, In accordance with the systems and methods described herein, the player 114 can selectively direct funds 116A associated with the payment vehicle 116 to the gaming account 188. Directing the funds 116A from the financial account 128 to the gaming account 188 can be in response to an authorization request transmitted over the appropriate payment networks to seek authorization from the issuer processor computing system 126. In accordance with some implementations, the player 114 can also selectively direct funds 116B associated with the gaming account 188 to payment vehicle 116. Directed funds 116B to the payment vehicle 116 can utilize any suitable type of transaction, such as an Original Credit Transaction (OCT), a refund-based payments processing, or the like. Such posting of funds to the payment vehicle 116 (i.e., to the financial account associated therewith) can use open-loop payment rails and may be subject to velocity thresholds set by the associated financial institution, and in some implementations monitored by a transaction facilitator, as described in more detail below. Thus, in accordance with some embodiments of the disclosure, the player 114 can transfer funds, either in real-time or subject to a transaction delay, and in some cases back and forth, between a financial account 128 and the gaming account 188 of the player 114.

In some embodiments, the directed funds 116A are transferred (i.e. credited) to the destination account in substantially real time as to allow nearly immediate access to the funds for wagering purposes by the player. In other embodiments, a "pause" between an initiated transfer and an availability of the transferred funds can be implemented. For example, to the extent that regulators and responsible gaming advocates believe that a "pause" is significant to minimize reckless gaming, the systems and methods described herein are adaptable to institute certain delay in accessing funds. In some embodiments, the directed funds 116B are transferred to the payment vehicle 116 (or account associated therewith) in substantially real time as to allow nearly immediate access to the funds via use of the payment vehicle 116 by the player. In other embodiments, a delay between an initiated transfer and an availability of the transferred funds can be implemented. Also, with regard to funds 116A and/or funds 116B, additional regulation or limitations on the fund transfers can be instituted, such as based on transaction amount, transaction velocity, payment vehicle type, and so forth.

As shown in FIG. 2A, the gaming environment 102 can maintain a player loyalty account 152 associated with the player 114. During the enrollment process, an address of the player 114 can be received and associated with the player loyalty account 152. In accordance with the present disclosure, one or more payment vehicles 116 can also be associated with the player loyalty account 152. As such, in association with transferring funds from the financial account 128 to the wagering account 104, an address verification check between the payment vehicle 116 used for the transaction and the registered address on the wagering account 104 and/or the player loyalty account 151 can be performed. Using the player loyalty account 152 to link to the payment vehicle 116 of the player 114 allows for the player 114 to generally access funds associated with the payment vehicle 116 at a gaming device or to purchase chip, etc., without having to provide the payment vehicle 116 itself to initiate the transaction.

Referring still to FIG. 2A, gaming accounts associated with the player 114 are shown as wagering accounts 104, which can be managed by management computing system (not shown) affiliated with the gaming environment 102. In the illustrated embodiment, the wagering accounts 104 include a brick-and-mortar wagering account 106, a race-and-sport wagering account 108, and an iGaming wagering account 110. The brick-and-mortar wagering account 106 is generally an electronic ledger associated with a player's table and slot wagers. The race-and-sport wagering account 108 is generally an electronic ledger associated with a player's sports and non-pari-mutuel race wagers. The iGaming wagering account 110 is generally an electronic ledger associated with a player's online wagers, such as online poker and virtual gaming. It is noted that in some jurisdictions, gaming regulations forbid the transferring of a player's funds stored in one wagering account 106, 108, 110 directly to another wagering account 106, 108, 110.

Figure 2B:
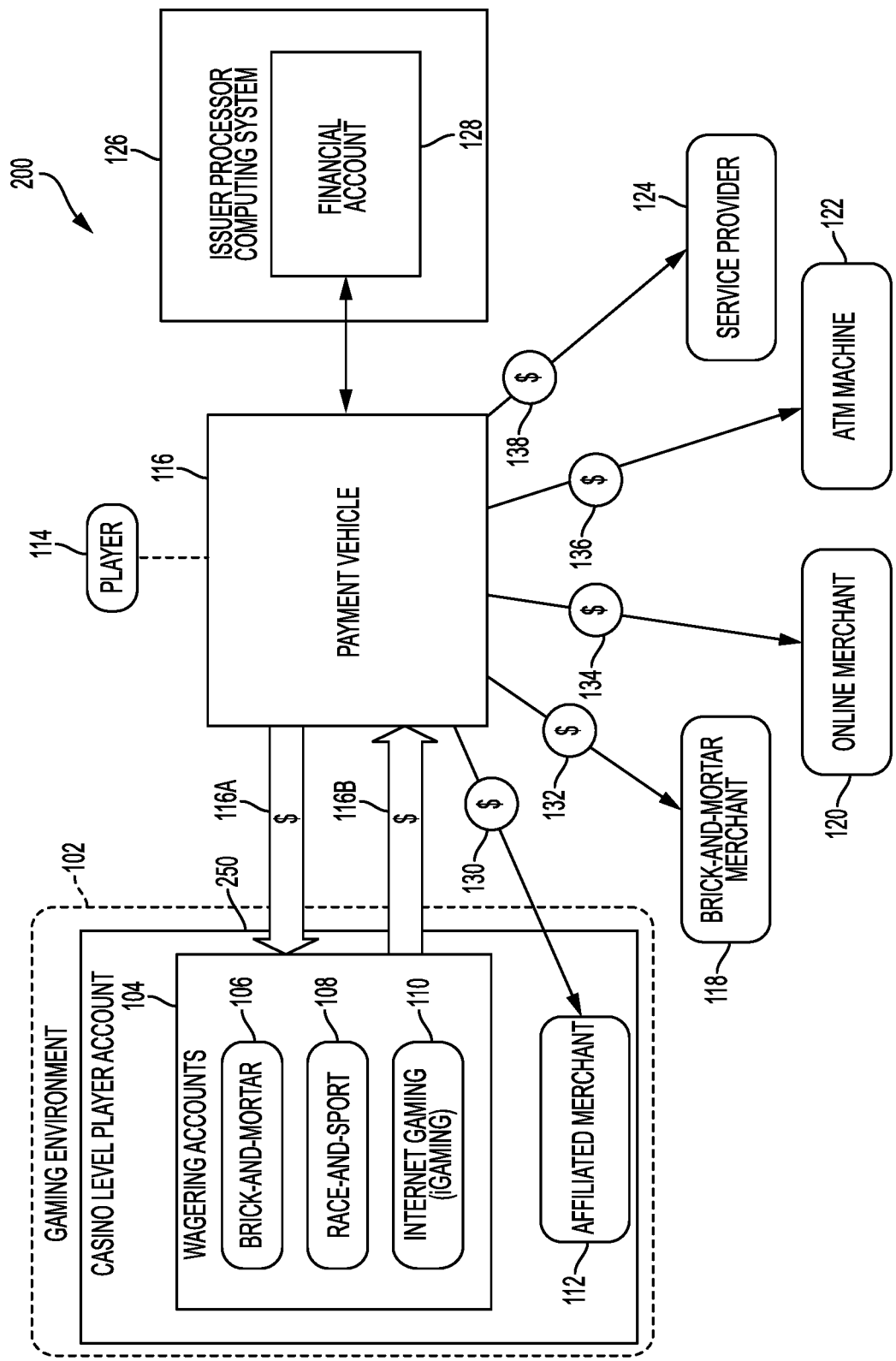
FIG. 2B depicts the system view and flow process of FIG. 2A further comprising a casino level player account in accordance with one non-limiting embodiment.

FIG. 2B depicts another embodiment of the system view and flow process 100 illustrated in FIG. 2A. As shown in FIG. 2B, the system view and flow process 200 additionally comprises a gaming account that is a casino level player account 250. The casino level player account 250 can be generally an electronic ledger associated with a player. It can also be associated one or more wagering accounts 104. The casino level player account 250 can offer a variety of functionality to the player 114. For example, a player 114 can direct funds associated with their financial account 128 to the casino level player account 250, which may be referred to as an electronic wallet. In certain embodiments, the player 114 can direct funds stored in one of the wagering accounts 104 or other gaming account to the casino level player account 250. The player 114 can then direct the funds held in the casino level player account 250 to a different wagering account 104. Additional details regarding example transfers of funds are described below in connection with FIG. 4. Further, in some embodiments, the funds held in the casino level player account 250 may be usable for gaming across two or more wagering activities, as may be permitted in various gaming jurisdictions, such that the casino level player account 250 is a consolidated wagering account. In some embodiments, the player 114 can selectively utilize funds held by the casino level player account 250 for closed-loop point of sale transactions, either retail transactions (such as at an affiliated merchant 112) or closed-loop cash outs, all while enjoying reduced interchange fees due to the closed-loop nature of the transactions. Therefore, in some cases, performing transactions with funds in the casino level player account 250 is less costly to the gaming operator of the casino environment 102 and to the player 114. For some implementations comprising a casino level player account 250, when a player 114 directs funds 116A into the gaming environment 102, the player 116 can still direct them to a particular wagering account 104, as illustrated. In other implementations comprising a casino level player account 250, a player 114 can direct funds 116A into the casino level player account 250. The player 114 can subsequently direct those funds to a particular wagering account 104 or use the funds for closed-loop transactions.

Figure 3:
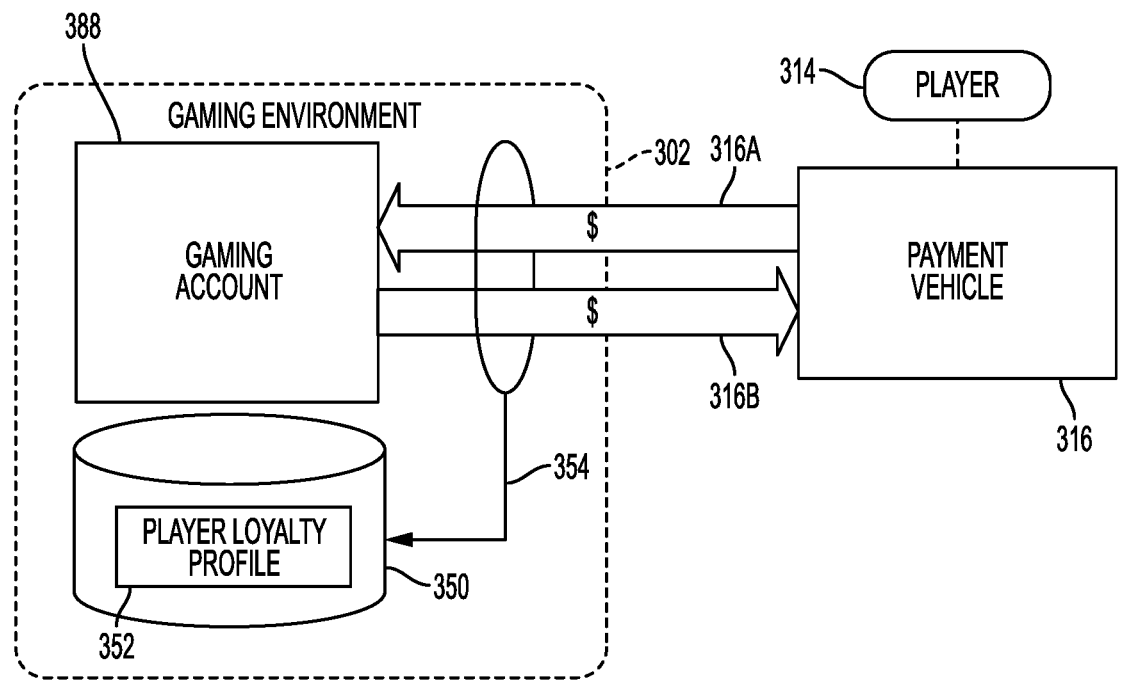
FIG. 3 is a diagrammatic representation of an association between vehicle payment vehicle and gaming account in accordance with various non-limiting embodiments.

FIG. 3 is a diagrammatic representation of an association between a payment vehicle 316 and a gaming account 388 in accordance with one non-limiting embodiment. Similar to FIGS. 1, 2A and 2B, the payment vehicle 316 can be a credit or debit payment vehicle that is issued to a player 314, and in accordance with the systems and methods described herein, the player 314 can selectively direct the transfer of funds 316A into a gaming account 388 of a casino environment 302. The player 314 can also direct the transfer of funds 316B from the gaming account 388 (i.e., "cash out") by transferring funds to the payment vehicle 116 via a transaction, such as an Original Credit Transaction (OCT). As is to be appreciated, the gaming account 388 illustrated in FIG. 3 can be, without limitation, a wagering account, a casino level player account, or a combination thereof and the payment vehicle 316 is linked to a financial account (not shown).

In this embodiment, the gaming environment 302 is linked to a player loyalty database 350 which stores data in the form of a player loyalty profile 352 associated with the player 314. The player loyalty profile 352 can include data associated with the gaming history of the player 314, incentives, comps, and other tracking-related information, as is known in the art. The loyalty profile 352 can also include information related to fund transfer data, as illustrated by data capturing 354. Accordingly, the player loyalty profile 352 can include, for example, dates of transfers, amounts of transfers, times of transfers, number of transfers, payment card type associated with transfers, and so forth.

Figure 4:
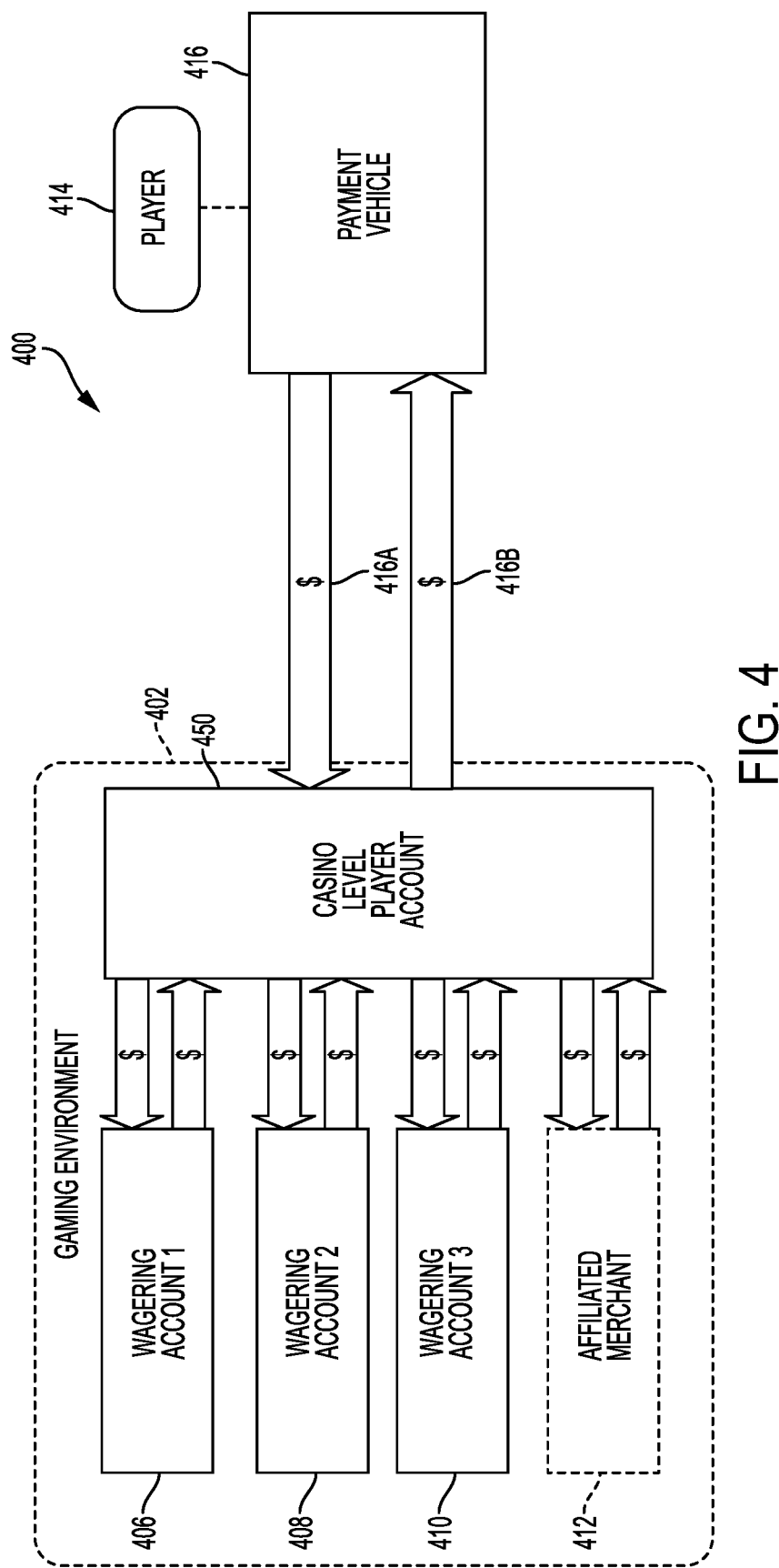
FIG. 4 schematically illustrates example cash flows between example gaming accounts associated with a player and cash flows between the gaming accounts and vehicle payment vehicle issued to the player in accordance with one non-limiting embodiment.

FIG. 4 schematically illustrates example cash flows between example gaming accounts associated with a player 414 along with the cash flows between the gaming accounts and payment vehicle 416 issued to the player. In the illustrated embodiments, the gaming accounts in the casino environment 402 are shown as a casino level player account a plurality of wagering accounts. In accordance with the systems and methods described herein, the player 414 can selectively direct the transfer of funds 416A into a casino level player account 450. In some implementations, the player 514 can also direct the transfer of funds 516B from the casino level player account 550. As is to be appreciated, the payment vehicle 416 is linked to a financial account (not shown). For funds held by the casino level player account 450, the player 414 can selectively transfer a portion (or all) of the funds in and out of various wagering accounts 406, 408, 410, shown as wagering account 1, wagering account 2 and wagering account 3. The player 414 can also utilize the casino level player account 440 to initiate financial transactions at an affiliated merchant 412 as a closed-loop transaction. The affiliated merchant 412 can be, for example, a retailer on a casino property, an ATM, or other type of closed-loop merchant.

Figure 5:
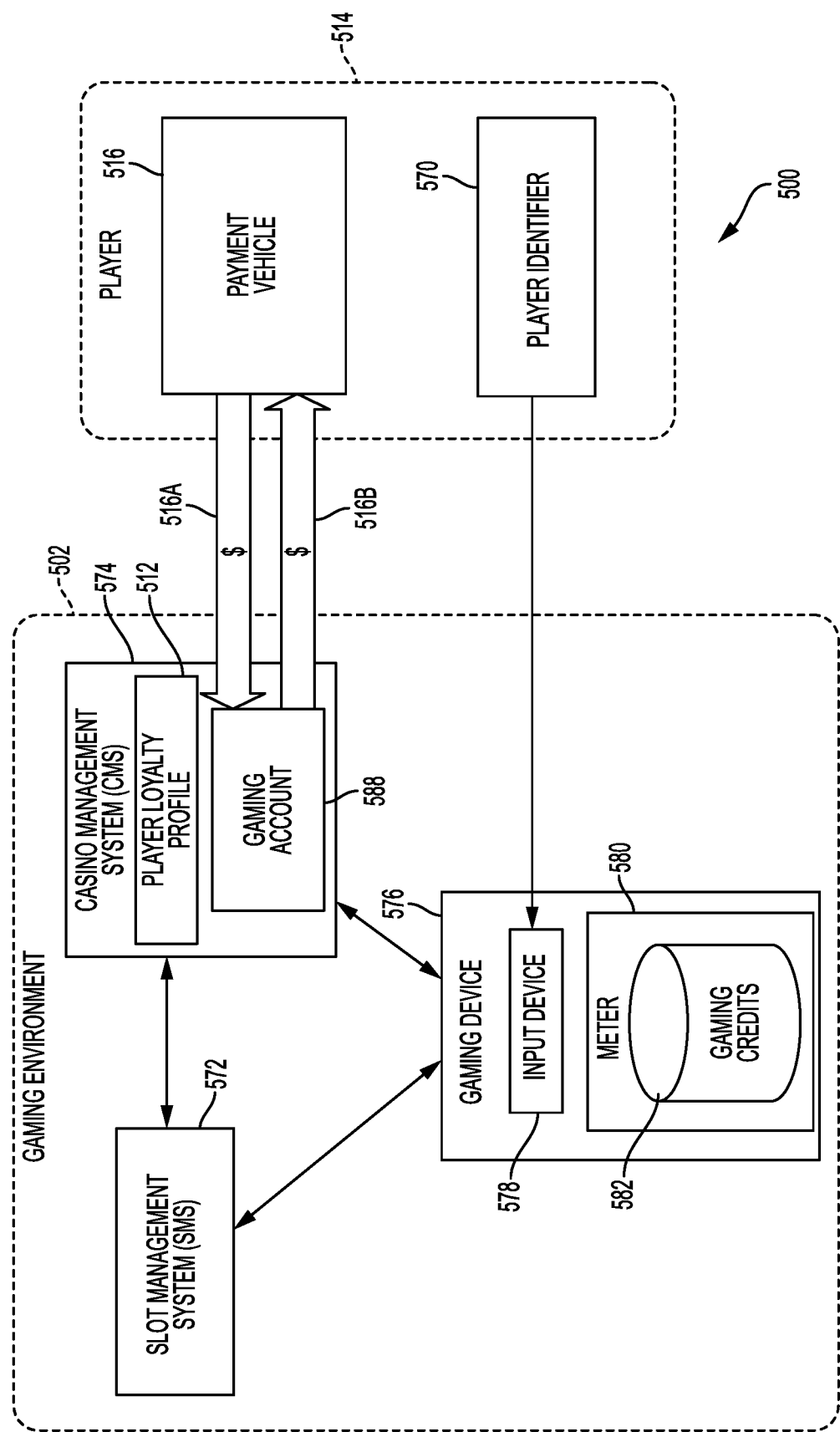
FIG. 5 is a diagrammatic representation of an example gaming system and flow process in accordance with one non-limiting embodiment.

FIG. 5 is a diagrammatic representation of another example gaming system and flow process 500 in accordance with one non-limiting embodiment. This gaming system and flow process 500 includes a networked gaming device 576, such as a slot machine, a casino kiosk, casino gaming pit computing system, sports book computing system, and so forth. As is generally known in the art, the gaming device 576 can be in networked communication with a variety of computer-based entities, such as a slot management system (SMS) 572 and a casino management system (CMS) 574. In some gaming environments, the SMS 572 and the CMS 574 may collectively be considered components of a casino computing system. The networked arrangement can include wired and/or wireless communication links. Examples of suitable networks can include a local area network (LAN), virtual private network (VPN), an Internet connection, and/or any other network configuration that is capable to enable the CMS 574 and SMS 572 to communicate with the gaming device 576 and other devices. The networked arrangement can provide two-way communications between the CMS 674 and SMS 572 and gaming device 576. In the illustrated embodiment, the CMS 574 maintains a player loyalty profile 512 for a player 514 and maintains gaming accounts for the player 514, shown as wagering account 514. Other embodiments however can use different configurations without departing from the scope of the present disclosure. For example, the player loyalty profile 512 may be maintained by a third-party customer relationship management service or the casino gaming system.

The gaming system can comprise one or more gaming accounts (shown as a single gaming account 588 in FIG. 5 for the sake of illustration). While the gaming account 588 is schematically shown within the CMS 574, other gaming environments can maintain the gaming account 588 elsewhere, such as by a separate wagering account management entity or a third-party wagering account provider. In the illustrated embodiment, the gaming account comprises a brick-and-mortar gaming account, so that gaming credits can be provided to the meter 580 of the gaming device 576, as described below.

A payment vehicle 516, such as a debit or credit card, or other suitable type of payment vehicle, is issued to the player 514 by a bank or other financial entity. A player identifier 570 is also assigned to the player 514 so that an operator of the gaming environment 502 can properly identify the player 514. In some embodiment, the player identifier 570 is expressed as a number or string that is provided to the player 514 on a physical card (such as a loyalty card or player's card). In other embodiments, the player identifier 570 can be graphical-based or be chip-based and utilize near-field communication (NFC) protocols, for example. In any event, as illustrated in FIG. 5, the player identifier 570 is provided to an input device 578 of the gaming device 576. As is to be appreciated, the particular type of input device 578 used to read the player identifier 570 will depend on the particular format of the player identifier 570. In some embodiments, the input device 578 is a magnetic card reader, while in other embodiments the input device 578 is an optical scanner. In some embodiments, in addition to providing the player identifier 570, additional credentials (such as a PIN) must be provided by the player 514 for authentication purposes.

Upon receiving the player identifier 570, along with any other credentials, the gaming device 576 provides the data to the SMS 572 and/or the CMS 574 through network communications. Upon authenticating the identification of the player 514, various types of financial transactions related to the payment vehicle 516 and/or the gaming account 588 can be offered to the player 514. In some embodiments, such offerings are provided on a graphical display on the gaming device, as provided to the gaming device 576 by communications from the SMS 572 and/or CMS 574. In one embodiment, for example, an available balance in a financial account associated with the payment vehicle 516 is displayed to the player 514. Additional details regarding the retrieval of the available balance using a transaction facilitator is described in more detail below with regard to FIG. 7. The gaming device 576 can request a dollar amount be inputted by the player 514 and once the player 514 selects a dollar amount, a transfer of funds 516A can be initiated to direct funds associated with the payment vehicle 516 to the gaming account 588. For instance, an authorization request can be transmitted through the appropriate payment network to an issuer of payment vehicle 516 requesting funds in the denomination selected by the player 514. In some embodiments, full address verification of the address associated with the player identifier 570 and the address associated with the payment vehicle 516 is performed prior to the transfer of funds. Further, other limitations on funds transfers can be imposed, as discussed above, such as transaction velocity limits.

Depending on the type of gaming account 588 associated with the player, the funds can be transferred directly into a wagering account associated with the gaming device 576. Alternatively, funds can be received in a casino level player account and subsequently transferred to a wagering account associated with the gaming device 576. In any event, upon receipt of the funds 516A, the funds can be converted to gaming credits. The gaming credits 582 can then be metered into gaming device 576 by its meter 580. The player can then use the gaming credits for wagering at the gaming device 576, as is known in the art.

At the conclusion of a gaming session, the player 614 may initiate a "cash out" action at the gaming device 576. The gaming device 576 can prompt the player 514 to select a "cash out" technique, such as printing a ticket for subsequent redemption, a cash-based payout, or pushing funds to a casino level player account. In some embodiments, the player 514 may be provided with the option to transfer gaming credits 682 to the payment vehicle 616 in the form of funds. In such embodiments, when the player 614 initiates a "cash out" action at the gaming device 676, the gaming device 676 can prompt the player 614 to select the "cash out" technique, which can include an identification of a payment vehicle to which funds can be transferred. Should the player 614 choose the latter, the gaming credits 682 can be first transferred out of the gaming device 676 and into the gaming account 688, where it is converted to funds. Then a transfer of funds 616B is initiated using a open-loop communications with the financial institution maintaining the financial account to credit that account. Such transfer of funds 616B may be subject to velocity thresholds or other transfer limitations. As described in more detail below, a transaction facilitator can be used to facilitate the transmission of such credit and debit messaging. From the perspective of the player 614, the gaming credits that had been associated with the gaming device 676 are converted to funds that are available for access by the player's payment vehicle 616. Such conversion of gaming credits to available funds for access by the payment vehicle 616 can be in substantially real-time.

Figure 6:
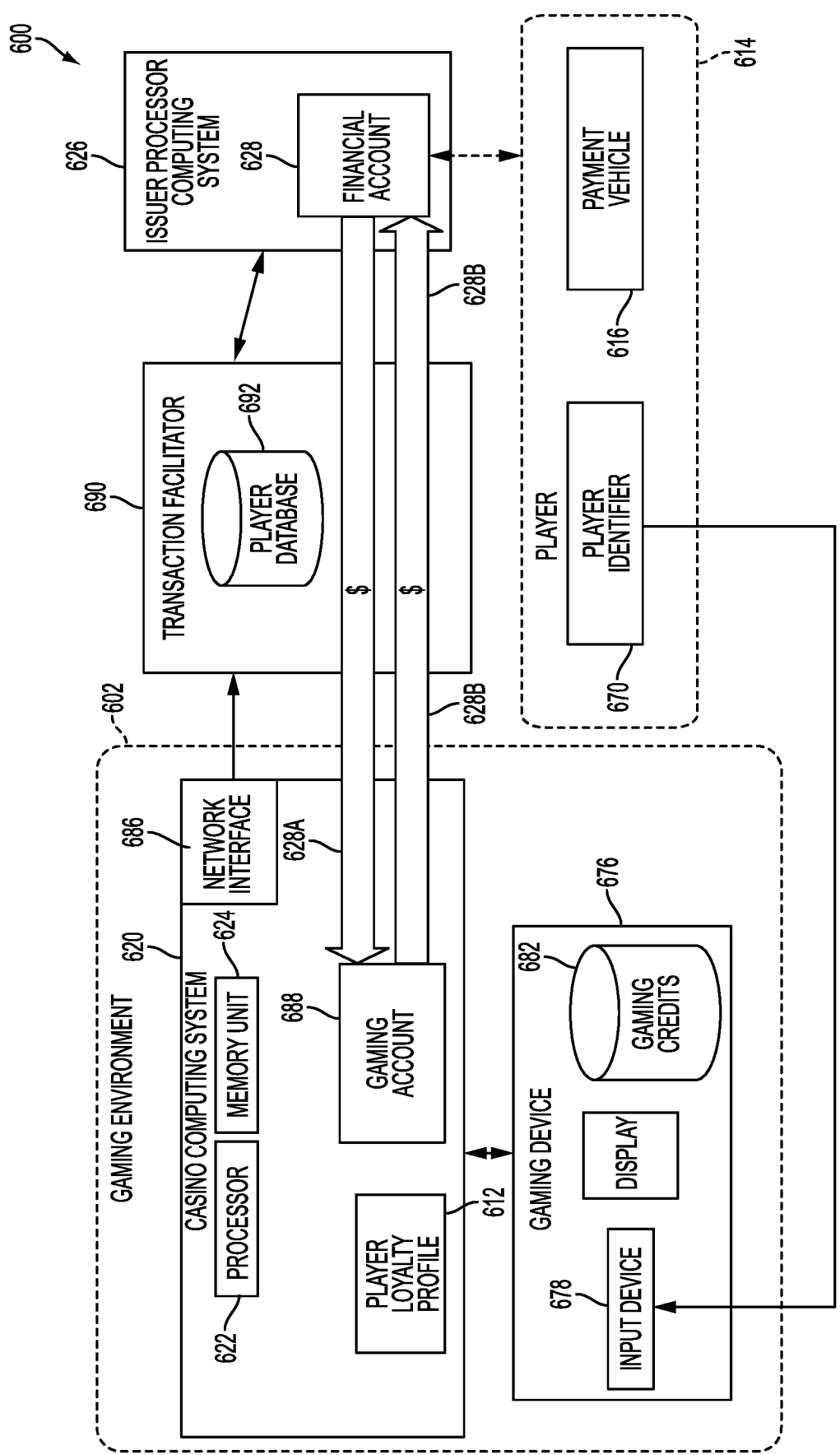
FIG. 6 is an example arrangement of a transaction facilitator interacting with a gaming environment and an issuer processor computing system in accordance with one non-limiting embodiment.

FIG. 6 is an example arrangement 600 of a transaction facilitator 690 interacting with both a gaming environment 602 and an issuer processor computing system 626, in accordance with one non-limiting embodiment. Generally, the transaction facilitator 690 receives financial transaction communications from the gaming environment 602. In some environments, such messages are received via a communications network, such as the SPAN™ network offered by Sightline Interactive LLC of Las Vegas, Nev. In some embodiments, the communications are received through an application programing interface (API) or other web-based messaging. The transaction facilitator 690 can also be in closed communication with the issuer processor computing system 626 that maintains the financial account 628 associated with a payment vehicle 616. Additionally or alternatively, the transaction facilitator 690 can also be communication with the issuer processor computing system 626 through a payment network. It is noted that while the transaction facilitator 690 is schematically illustrated as a single entity, it is to be appreciated that this disclosure is not so limited. Instead, the functionality of the transaction facilitator 690, as described herein, can be distributed across, or otherwise performed by, a plurality of various entities, such payment gateways, acquirer processors, and other types of payment intermediaries. Also, the transaction facilitator 690, or at least components thereof, can reside within the gaming environment 602 or be controlled by an operator of the gaming environment. In such embodiment, the transaction facilitator 690 can be configured to communicate with the issuer processor computing system 626 through a secured communication link. Further, the transaction facilitator 690, or at least components thereof, can be controlled by the issuer processor computing system 626. Therefore, the transaction facilitator 690 may be operated by, or otherwise controlled by a variety of different entities. The transaction facilitator 690 can also have a one-to-one processing relationship with the gaming environment 602, as illustrated. It is to be appreciated, however, that the transaction facilitator 690 can also have a one-to-many configuration such that it has a processing relationship with a plurality of different gaming environments.

The casino computing system 620, which can include one or more processors 622 and one or more computer memory units 624, can process the player identifier. For convenience, only one processor 622 and only one memory unit 624 are shown in FIG. 6. The processor 622 can execute software instructions stored on the memory unit 624. The processor 622 can be implemented as an integrated circuit (IC) having one or multiple cores. The memory unit 624 can include volatile and/or non-volatile memory units. Volatile memory units can include random access memory (RAM), for example. Non-volatile memory units can include read only memory (ROM), for example, as well as mechanical non-volatile memory systems, such as, for example, a hard disk drive, an optical disk drive, etc. The RAM and/or ROM memory units can be implemented as discrete memory ICs, for example. In some embodiments, the casino computing system 620 can execute the slot management system and the casino management system described above.

Similar to input of the player identifier 670 described in FIG. 6, a player identifier 670 associated with the player 614 can be provided to the input device 678 of a gaming device 676. The gaming device can have one or more displays 684. The player identifier 670 can be used to identify a player loyalty profile 612 of the player. The casino computing system 620 can be configured to transmit the player identifier 670, or other player identifying data, to the transaction facilitator 690 using a suitable network interface 686.

Upon receiving the player identifier 670, or other player identifying data, the transaction facilitator 690 can match the player identifying data to a particular financial account 628, as can be maintained by a player database 692. In some implementations, the player identifier 670 is linked to the financial account 628 by way of an associated payment vehicle 616. Further, the player identifier 670 may be linked to a plurality of payment vehicle(s) 616 and/or a plurality of financial account(s) 628 from which funds may be used by the player 614 to load into the gaming device 676. While the player database 692 is illustrated as a component of the transaction facilitator 692, this disclosure is not so limited. Such information can be stored by any suitable entity in the system hierarchy, including by an entity within the gaming environment 602. It is noted, however, that by maintaining the player database 692 outside the gaming environment 602, Payment Card Industry (PCI) compliance requirements of the gaming environment 602 may be reduced.

Once the financial account 628 of the player 614 has been identified by the transaction facilitator 690, the transaction facilitator 690 can transmit the appropriate messaging to the issuer processor computing system 626. For example, messages may include a balance inquiry, an authorization request, and so forth. For fund transfers, the transaction facilitator 690 can facilitate the message flow to affect the transfers of funds 628A by debiting the financial account 628 and crediting the gaming account 688 or the message flow to affect the transfers of funds 628B by debiting the gaming account 788 and crediting the financial account 628. In some embodiments, such transfer of funds 628A and/or 628B may be subject to limits, such as to provide limitations to an amount of funds that can be transferred in a single transaction, an amount of transactions that can occur over a particular period of time, or other suitable limitations. As described above, funds transferred into the gaming account 688 can be converted to gaming credits 682 for gaming at the gaming device 676. Alternatively, depending on the type of the gaming account 688, the funds can be used for other types of gaming, such as iGaming, race-and-sports gaming, and so forth.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A non-transitory computer-readable medium may also include memory storage that may be physical, virtual, permanent, temporary, semi-permanent and/or semi-temporary.

A "computer," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

The examples presented herein are intended to illustrate potential and specific implementations. It can be appreciated that the examples are intended primarily for purposes of illustration of the invention for those skilled in the art. No particular aspect or aspects of the examples are necessarily intended to limit the scope of the present disclosure. For example, no particular aspect or aspects of the examples of system architectures, table layouts, or report formats described herein are necessarily intended to limit the scope of the disclosure.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present disclosure based on the description herein with only a reasonable effort and without undue experimentation.

In various embodiments, the systems and methods described herein may be configured and/or programmed to include one or more of the above-described electronic, computer-based elements and components. In addition, these elements and components may be particularly configured to execute the various rules, algorithms, programs, processes, and method steps described herein.

While various embodiments have been described herein, it should be apparent, however, that various modifications, alterations and adaptations to those embodiments may occur to persons skilled in the art with the attainment of some or all of the advantages of the present disclosure. The disclosed embodiments are therefore intended to include all such modifications, alterations and adaptations without departing from the scope and spirit of the present disclosure as set forth in the appended claims.

The invention claimed is:

1. A computer-based method of transferring funds between a financial account and a gaming account, the method performed by one or more computing devices comprising instructions stored in a memory, which when executed by one or more processors of the one or more computing devices, cause the one or more computing devices to perform the method comprising:
    associating in computer memory of the one or more computing devices, the financial account of a player with a player loyalty account identifier of a gaming environment, wherein the financial account holds a balance of funds maintained by a computing system on a bank card network;
    receiving, by one or more computing devices, the player loyalty account identifier of the player, wherein the player loyalty account identifier is associated with the gaming account having a balance maintained by a casino computing system of the gaming environment;
    identifying, by any of the one or more computing devices, the financial account based on the association of the financial account and the player loyalty account identifier in the computer memory of the one or more computing devices;
    receiving, by any of the one or more computing devices, a request to transfer a first amount of funds from the financial account maintained by the computing system on the bank card network into the gaming account maintained by the casino computing system of the gaming environment, wherein the request does not identify the financial account;
    subsequent to determining that the requested transfer satisfies a velocity check instructing, by any of the one or more computing devices, the computing system to decrease the balance of the financial account, wherein the velocity check determines whether a number of times the financial account has been used to fund the gaming account within a time period exceeds a threshold number of times; and
    subsequent to determining that the requested transfer satisfies the velocity check instructing, by any of the one or more computing devices, the casino computing system to increase the balance of the gaming account, wherein the balance of the gaming account is usable for wagering.

2. The computer-based method of claim 1, wherein the gaming account is a first gaming account, the method further comprising:
    subsequent to the increase of the balance of the first gaming account, receiving by any of the one or more computing devices, a request to transfer an amount of funds from the first gaming account to a second gaming account;
    causing, by any of the one or more computing devices, an increase of the balance of the financial account and a decrease of the balance of the first gaming account; and
    causing, by any of the one or more computing devices, a decrease of the balance of the financial account and an increase of the balance of the second gaming account.

3. The computer-based method of claim 1, wherein the gaming account is a first gaming account, the method further comprising:
    causing, by any of the one or more computing devices, a decrease of the balance of the first gaming account and an increase of the balance of a second gaming account.

4. The computer-based method of claim 3, the method further comprising:
    subsequent to the increase of the balance of second gaming account, receiving by any of the one or more computing devices, a request to transfer an amount of funds from the second gaming account to a third gaming account;
    causing, by any of the one or more computing devices, an increase of the balance of the first gaming account and a decrease of the balance of the second gaming account; and
    causing, by any of the one or more computing devices, an increase of a balance of the third gaming account and a decrease of the balance of the first gaming account.

5. The computer-based method of claim 1, wherein the gaming account is any of a wagering account, a casino level player account, and a metered gaming credit account.

6. The computer-based method of claim 1, wherein increasing of the balance of the gaming account occurs subsequent to a delay.

7. A computer-based method of transferring funds between a financial account and a gaming account, the method performed by one or more computing devices comprising instructions stored in a memory, which when executed by one or more processors of the one or more computing devices, cause the one or more computing devices to perform the method comprising:
    associating in computer memory of the one or more computing devices, the financial account of a player with a player loyalty account identifier of a gaming environment, wherein the financial account holds a balance of funds maintained by a computing system on a bank card network;

receiving, by one or more computing devices, the player loyalty account identifier of the player, wherein the player loyalty account identifier is associated with the gaming account having a balance maintained by a casino computing system of the gaming environment;

receiving, by any of the one or more computing devices, a request to transfer a first amount of funds from the financial account maintained by the computing system on the bank card network and associated with the player loyalty account identifier of the gaming environment into the gaming account maintained by the casino computing system of the gaming environment wherein the request does not identify the financial account;

only if the requested transfer satisfies a velocity check instructing, by any of the one or more computing devices, the computing system to decrease the balance of the financial account; and only if the requested transfer satisfies the velocity check instructing, by any of the one or more computing devices, the casino computing system to increase the balance of the gaming account, wherein the balance of the gaming account is usable for wagering.

8. The computer-based method of claim 7, wherein the gaming account is a first gaming account, the method further comprising:

subsequent to the increase of the balance of the first gaming account, receiving by any of the one or more computing devices, a request to transfer an amount of funds from the first gaming account to a second gaming account;

causing, by any of the one or more computing devices, an increase of the balance of the financial account and a decrease of the balance of the first gaming account; and causing, by any of the one or more computing devices, a decrease of the balance of the financial account and an increase of the balance of the second gaming account.

9. The computer-based method of claim 7, wherein the gaming account is a first gaming account, the method further comprising:

causing, by any of the one or more computing devices, a decrease of the balance of the first gaming account and an increase of the balance of a second gaming account.

10. The computer-based method of claim 9, the method further comprising:

subsequent to the increase of the balance of second gaming account, receiving by any of the one or more computing devices, a request to transfer an amount of funds from the second gaming account to a third gaming account;

causing, by any of the one or more computing devices, an increase of the balance of the first gaming account and a decrease of the balance of the second gaming account; and causing, by any of the one or more computing devices, an increase of a balance of the third gaming account and a decrease of the balance of the first gaming account.

11. The computer-based method of claim 7, wherein the gaming account is any of a wagering account, a casino level player account, and a metered gaming credit account.

12. The computer-based method of claim 7, wherein increasing of the balance of the gaming account occurs subsequent to a delay.

13. The computer-based method of claim 7, wherein the financial account is associated with an open-loop payment vehicle.

14. The computer-based method of claim 13, wherein the open-loop payment vehicle is any of a debit payment vehicle and a credit payment vehicle.

15. The computer-based method of claim 14, wherein funds held in the financial account are usable for payment transactions at any of a plurality of merchants associated with the bank card network.

\* \* \* \* \*